United States Patent
Baker

[15] 3,666,773
[45] May 30, 1972

[54] 2,2,3,4,5,5-HEXACHLORO-2,5-DIHYDROTHIOPHENE 1,1 DIOXIDE AND ITS USE

[72] Inventor: Don Robert Baker, Orinda, Calif.
[73] Assignee: Stauffer Chemical Company, New York, N.Y.
[22] Filed: Oct. 2, 1969
[21] Appl. No.: 863,320

[52] U.S. Cl................................260/332.1, 424/275
[51] Int. Cl.............................A61k 27/00, C07d 63/08
[58] Field of Search.........................260/332.1, 332.5

[56] References Cited

UNITED STATES PATENTS 2,975,194   3/1961   Berkey.................260/332.1

Primary Examiner—John D. Randolph
Assistant Examiner—Cecilia M. Shurk
Attorney—Daniel C. Block, Edwin H. Baker and Albert J. Adamcik

[57] ABSTRACT

The compound 2,2,3,4,5,5-hexachloro-2,5-dihydrothiophene-1,1 dioxide and its use to control bacteria and fungi.

1 Claim, No Drawings

2,2,3,4,5,5-HEXACHLORO-2,5-DIHYDROTHIOPHENE 1,1 DIOXIDE AND ITS USE

This invention relates to the compound 2,2,3,4,5,5-hexachloro-2,5-dihydrothiophene-1,1-dioxide and its use in controlling bacteria and fungi.

Prior art U.S. Pat. No. 3,073,692 described certain polychloro-2,3-dihydrothiophene 1,1-dioxides which are stated to exhibit biological activity and are stated to be used as bactericides and fungicides.

One of the prior art compounds that is generally, but not specifically described, is a structural isomer of the compound of the present invention. The generic description of this compound is included in these compounds described as polyhalo-2,3-dihydrothiophene-1,1-dioxides of the formula

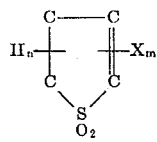

wherein X is halogen such as fluorine, chlorine, bromine, or iodine, chlorine being preferred, m is a number from 3 to 6 and n is a number equal to (6-m).

Thus, by selecting the proper X and m groups for the compound generically described above, the compound having the following formula is obtained:

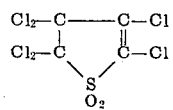

For purposes of comparison, the compound of the instant application, 2,2,3,4,5,5-hexachloro-2,5-dihydrothiophene 1,1-dioxide, has the structural formula:

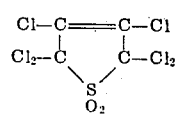

The compound of the present applicant differs from prior art compounds in several critical aspects. Firstly, the compound of the present invention cannot be prepared according to any teaching of U.S. Pat. No. 3,073,692, even that teaching specifically directed to the method of preparing the compounds described therein. According to said method, only 2,3-dihydrothiophene-1,1-dioxides are preparable and not 2,5-dihydrothiophene-1,1-dioxides.

More specifically, the method described in the patent for preparing the compound therein is by monodehydrohalogenation of compounds of the formula:

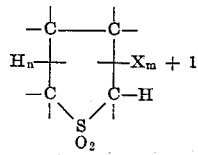

where m is a number from 3 to 6 inclusive and n is a number equal to (6-m) to yield compounds of the formula:

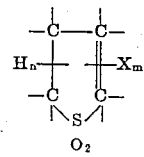

wherein X is halogen, m is a number from 3 to 6 and n is a number equal to (6-m).

Under a similar monodehydrohalogenation for compounds of the formula

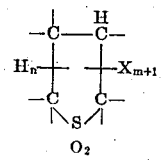

wherein m is also a number from 3 to 6, inclusive, and n is also a number equal to (6-m), compounds of the formula

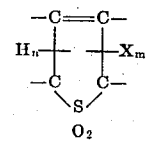

wherein X is halogen, m is a number from 3 to 6 and n is a number equal to (6-m), *are not* prepared.

Secondly, the compound of the present invention is unexpectedly superior to the compounds recited in U.S. Pat. No. 3,073,692 in some of its biological properties, especially when it is used as a bactericide. The exact reason for this superiority is not understood, but might be explained by a fundamental chemical difference that exists in the compound of this invention and said prior art compounds. Said chemical difference is not readily apparent when merely comparing structural formula. Assuming the degree of halogenation to be the same, it is believed that said difference exists possibly because the prior art compound has conjugated double bonds, whereas the compound of the present invention has non-conjugated double bonds. Said double bonds being those between either two carbon atoms, and the sulfur, and an oxygen atom.

Thirdly, the compound of the instant application is vastly superior to the compounds of U.S. Pat. No. 3,073,692 when it is used as a bactericide in soap.

The compound of this invention can be prepared according to the teaching of the following example.

EXAMPLE I 2,2,3,4,5,5-hexachloro-2,5-dihydrothiophene-1,1 dioxide

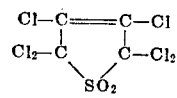

The above compound hereinafter called Compound 1, is prepared by mixing 15 g. 2,2,3,4,5,5-hexachloro-2,5-dihydrothiophene, 25 g. chromic anhydride, and 100 ml. glacial acetic acid and then heating the mixture to 90°–95° C. for 1 hour. The mixture is then cooled to room temperature and poured into 400 ml. water and then extracted with 100 ml. CHCl₃ to give a colorless extract. The extract is dried over MgSO₄ and evaporated in vacuum to yield 13 g. of an oil which soon crystallizes to a solid m.p. 48.5°–53° C. This product is recrystallized from cold n-pentane to yield 10 g. white crystals of the anticipated product, m.p. 52°–54° C. IR analysis confirmed the anticipated structure.

It has been found that the compound of this invention is an effective bacteriostatic and fungistatic agent. Whereas microbiological growths on various substances cause deterioration by the presence of the infestation, the application of an agent to retard this adverse growth is desired. Such substances liable to fungus and bacterial infection include cloth, textiles, leather, paint, soaps, paper, wood, plastic, oil, cutting fluids, and the like. It is contemplated herein that the microbiocidal composition of the present invention may be effectively incorporated or applied to any of the substances susceptible to microbiological growths. The compound is also an effective paper mill slime control agent.

For maximum effectiveness, the active ingredients of the present invention are admixed in microbiostaticly effective amounts with an inert adjuvant. In order to provide formulations particularly adapted for ready and efficient application to the materials to be treated, such formulations comprise those of both the liquid and solid types as well as the "aerosol" type formulations. Application can be directly to the substance to be protected from fungus or bacterial growth. In the pure state, the active ingredient may be too effective or too potent in some applications to have practical utility. A convenient method of treating cloth is by formulating the active ingredient with a soap or detergent and thereby imparting antiseptic or microbiocidal properties to the cloth as it is washed therewith.

For most effective protection, it is preferred to apply the materials in intimate contact, but thoroughly dispersed on or nearly in the surface to be protected. Therefore, the active ingredients have incorporated therewith a relatively inert agent or adjuvant as a dispersing medium, utilizing methods well-known to those skilled in the art.

More specifically, suitable formulations of the compound of this invention comprises the above-defined active ingredient and a suitable material as an adjuvant therefore. Fungistat and bacteriostat compositions are advantageously formulated by first preparing a solution thereof in an organic solvent and then adding the resulting solution to water or other carrier. If necessary, an emulsifying agent may be employed. The composition may also be incorporated into solid carriers, such inert materials as clay, talc, pumice, and the like. It may also be incorporated in hand soaps such as those containing sodium stearate, powdered soaps, or synthetic laundry detergent ingredients for control of bacteria and fungi which are washed with such materials. The chemical composition of these soaps and detergents is well known in the art. It may also be dissolved in liquefied gases such as fluorochloroethanes or methyl chloride and applied from aerosol bombs containing the solution. It should be noted that suitable formulations may also include adhesive agents, indicators, and other microbiocidal ingredients. Other ingredients may be supplementary insecticides, fungicides, bacteriocides, nematocides, or selective herbicides.

Since the amount of active agent of the present invention which is employed will vary with the microbiocidal effect sought, the utility of the treated material, type and dimensions of the material treated, it is evident, that no rigid limits can be set forth on the quantity required. Determination of the optimum effective concentration for a specific performance is readily ascertainable by routine procedures, as will be apparent to those skilled in the art.

As previously mentioned, the herein described compound is microbiostatic agents which are useful and valuable in controlling fungi and bacteria.

The compound of this invention is tested as a microbiocide in the following manner.

IN VITRO VIAL TESTS

The compound is tested to determine the microbiostatic efficacy when in contact with growing fungi or bacteria in an artificial medium. Four 1-ounce vials are partially filled, two with malt broth and two with nutrient broth. The compound to be tested is placed in the vials at the desired concentration (expressed in parts per million). The vials containing malt broth are inoculated with water suspensions of spores of the desired fungi, *Aspergillus niger*, and *Penicillium italicum*. Cells of the bacteria, *Escherichia coli* and *Staphylococcus aureus*, are inoculated into the vials containing nutrient broth (one species of organism per vial). The vials are then sealed and held for 1 week, after which time the growth of the organisms is observed and recorded. The tests are repeated using lower concentrations of the candidate compounds to determine the lowest concentration that can be used and still offer some control of the growth of the organism. Table I shows the results of the In Vitro tests.

TABLE I.—IN VITRO TEST

Lowest effective concentration (p.p.m.)

| | |
|---|---|
| Compound number | *1 |
| *Aspergillus niger* | (1) |
| *Penicillium italicum* | (0.5) |
| *Escherichia coli* | 10 |
| *Staphylococcus aureus* | 5 |

*Prepared in Example I.
( ) Indicates partial control at this concentration.

SOAP PLUG TEST

Approximately 10 mg. samples of Compound No. 1 and hexachlorophene are incorporated at a level of 1 percent in sodium stearate using two or three drops acetone with the mixture. The products are air dried to remove the acetone and pressed in a metal tube to form a soap plug approximately 10 mm. in diameter and 2 mm. thick. These plugs are placed on nutrient agar plates and are inoculated with either *Escherichia coli* or *Staphylococcus aureus* cells. The plates are incubated in an oven at 37° C. for 48 hours. The radius of the zone of biological inhibition around the soap plug is measured. The data from this test are stated in Table II.

TABLE II

| | Soap Plug Test | |
|---|---|---|
| | Zone of Biological Inhibition (mm) | |
| | E. coli | S. aureus |
| Compound No. 1 | 5 | greater than Blank |
| Hexachlorophene | 0 | same as Blank |
| Blank | 0 | 0 |

After the plugs are allowed to stand 1 week, they are again tested against *S. aureus* by incubating at 37° C. for 24 hours. The radius of the zone of biological inhibition around the soap plug is measured. The data from this test is stated in Table III.

TABLE III

| | Soap Plug Test | |
|---|---|---|
| | Zone of Biological Inhibition (mm) | |
| | E. coli | S. aureus |
| Compound No. 1 | 5 | greater than Blank |
| Hexachlorophene | 0 | same as Blank |
| Blank | 0 | 0 |

It is claimed:
1. 2,2,3,4,5,5-hexachloro-2,5-dihydrothiophene-1,1-dioxide.

* * * * *